United States Patent [19]

Sasaki et al.

[11] Patent Number: 4,839,744
[45] Date of Patent: Jun. 13, 1989

[54] VIDEO SIGNAL RECORDING METHOD AND ASSOCIATED RECORDING/REPRODUCING APPARATUS

[75] Inventors: Seishi Sasaki, Kobe; Shigeru Awamoto, Osaka; Tatsushi Bannai, Katano; Katsuya Yokoyama; Hiromichi Shibaya, both of Machida, all of Japan

[73] Assignees: Nippon Hoso Kyokai, Osaka; Matsushita Electric Industrial Co., Ltd., Tokyo, both of Japan

[21] Appl. No.: 90,441

[22] Filed: Aug. 28, 1987

[30] Foreign Application Priority Data

Sep. 1, 1986 [JP] Japan .................. 61-205433
Sep. 1, 1986 [JP] Japan .................. 61-205434

[51] Int. Cl.$^4$ ............................... H04N 9/89
[52] U.S. Cl. ............................ 358/320; 358/327
[58] Field of Search ............ 358/327, 328, 330, 14, 358/320; 360/22, 23

[56] References Cited

U.S. PATENT DOCUMENTS 4,630,131 12/1986 Ichinoi et al. .................. 358/330 X

OTHER PUBLICATIONS

IEEE Trans. C.E., vol. CE-32, No. 3, Aug. 1986, T. Bannai et al., "Wideband Video Signal Recorder Having Level and Linearity Corrector".

Primary Examiner—James B. Mullins
Attorney, Agent, or Firm—Stevens, Davis, Miller & Mosher

[57] ABSTRACT

Disclosed is a video signal recording system, in which the input video signal is rid of unneeded portions, transformed on the time axis and divided into n channels so that they are recorded in a bandwidth narrower than 1/n of original one. The system also enhances the latitude in choosing a clock frequency for time-axis conversion and a track width, thereby optimizing the picture quality and recording time length on a trade-off basis.

4 Claims, 7 Drawing Sheets

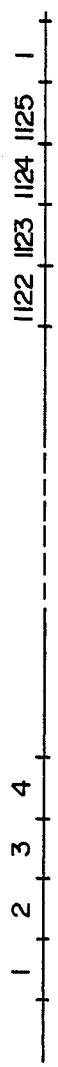
FIG. IA PRIOR ART
FIG. IB PRIOR ART

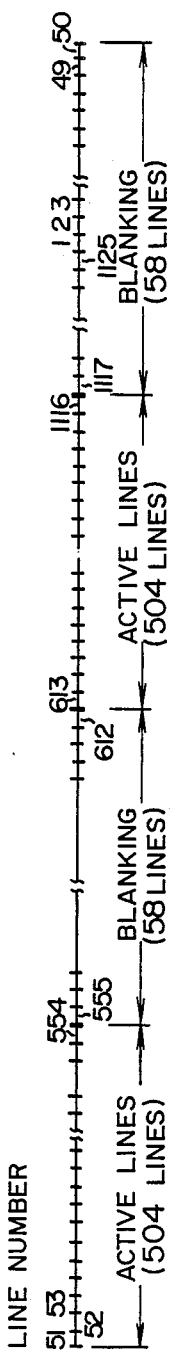
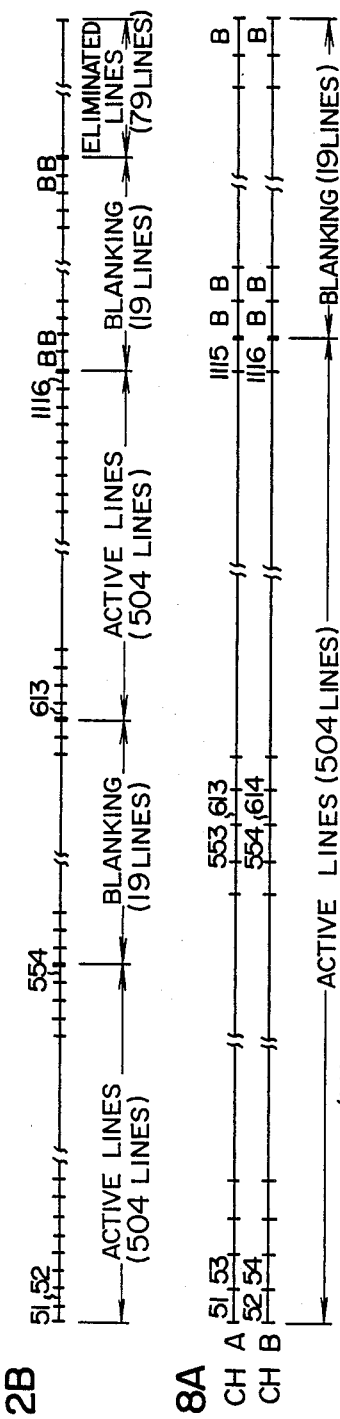
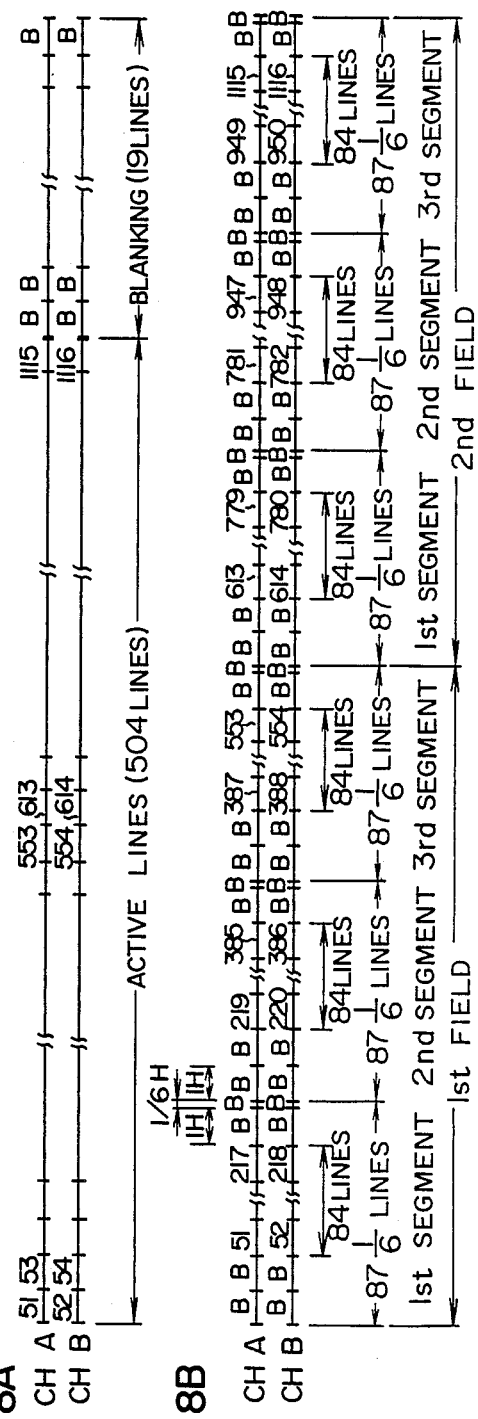
FIG. 2A FIG. 2B FIG. 8A FIG. 8B

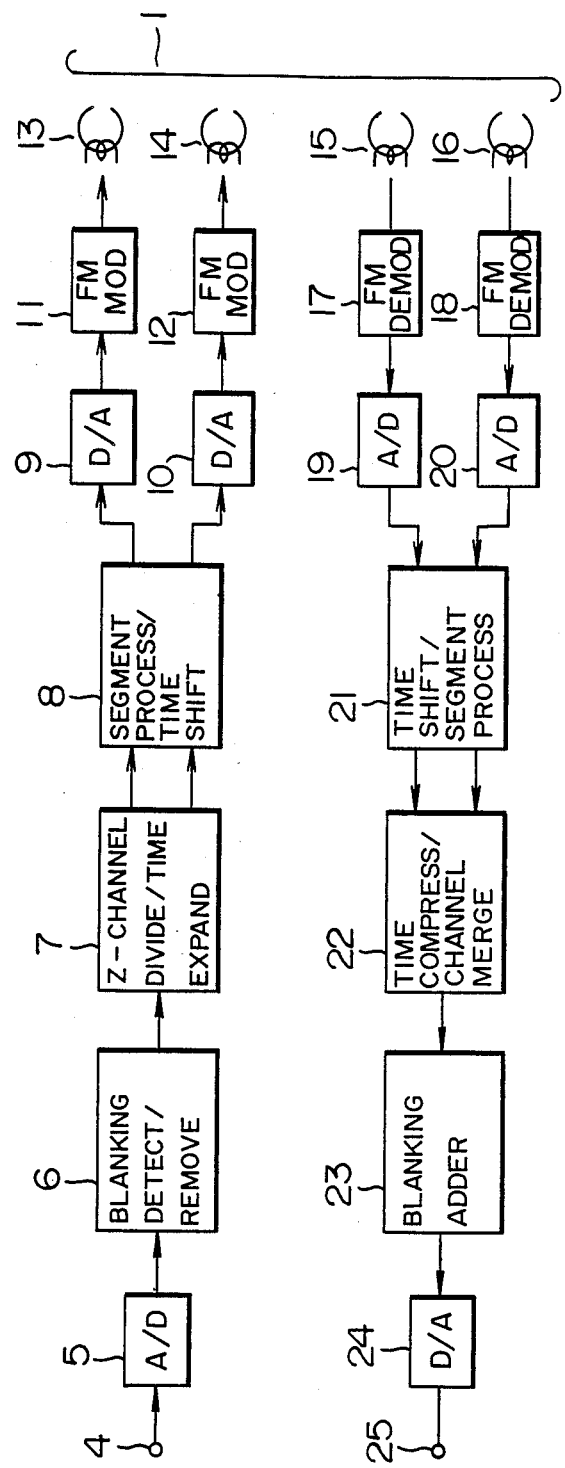

VIDEO SIGNAL RECORDING METHOD AND ASSOCIATED RECORDING/REPRODUCING APPARATUS

BACKGROUND OF THE INVENTION

This invention relates to a method of recording a video signal and an apparatus for recording and reproducing a video signal. Particularly, the invention relates to a video signal recording method and associated recording/reproducing apparatus, wherein an input video signal is transformed into recording signals with the number of scanning lines being reduced so that the recording signals have their bandwidth narrowed for recording.

Development activities for High Definition Television which is an innovative television system are under way. Among other things, "Hivision" system is best known in Japan, and this system promoted by NHK is given a public provisional standard. Two methods for recording a broad-band video signal with a VTR are: (1) The video signal is recorded dividedly in multiple channels; (2) The video signal is recorded at a higher head speed relative to the tape. When it is intended to realize a high-quality VTR without drastically changing the conventional mechanism of VTR, the method of the above item (1) is suitable.

An example of VTRs employing this recording system is described in publication: T. Bannai et al., "Wide Band Video Signal Recorder Having Level and Linearity Corrector", IEEE Trans. C.E., Vol. CE-32, No. 3, Aug. 1986. This VTR records a video signal by expanding each of 1125 scanning lines twofold on the time axis and dividing the signal into two channels so that each video signal has its bandwidth halved approximately for recording. FIGS. 1A and 1B show the input signal and recording signals, respectively, of this VTR with scanning lines being indicated by serial numbers 1 through 1125. As a natural consequence of this recording system, the whole scanning line information including the blanking signals is recorded on the tape.

Although it is a common scheme to record the entirety of input signal on the tape, signals portions such as vertical blanking pulses, where the picture information is not included at all, need not be recorded by VTRs in a sense of information recorder. Namely, the above-mentioned conventional VTR operates in the unnecessarily broad band due to recording unneedful signal portions.

SUMMARY OF THE INVENTION

This invention is intended to solve the foregoing prior art problem, and its prime object is to provide a video signal recording method and associated recording/reproducing apparatus capable of recording a video signal in a minimal bandwidth required.

According to this invention, the input video signal is rid of portions unneeded to reproduce pictures, expanded on the time axis, divided into n channels, and recorded in a bandwidth narrower than 1/n of original one. The expanded recording signal has its horizontal period made different at head switching from other horizontal period including picture information, thereby having the periodicity over frames, which is retained while allowing selections for the number of scanning lines recorded and the recording signal expansion factor. In case, for the optimization of recording density, the track pitch is chosen independently of the horizontal length of recording signal determined as mentioned above, the horizontal alignment would not be established, whereas this invention achieves the horizontal alignment by shifting the time axis for each track.

BRIEF DESCRIPTION OF THE DRAWINGS

FIGS. 1A and 1B are diagrams explaining the conventional time-axis expansion, two-channel division recording system;

FIGS. 2A and 2B are diagrams explaining the 1-frame period of an input video signal;

FIGS. 8A and 8B are diagrams used to explain the time-axis shift for each segment according to the second embodiment of this invention;

FIG. 10 is a block diagram of the video signal recording/reproducing apparatus based on the second embodiment of the invention.

DESCRIPTION OF THE PREFERRED EMBODIMENTS

This invention is designed to record a video signal on the tape by removing the unneeded portions from the input video signal, implementing the time-axis conversion for the remaining video signal, dividing the signal into n channels, and recording the multi-channel signals in a bandwidth narrower than 1/n of original one. The invention also contemplates to gain the latitude in choosing the clock frequency for time-axis conversion and the track width in order to optimize the picture quality and recording time length on a trade-off basis. In regard to the latitude of clock frequency, if the frame period becomes unequal to a multiple of the expanded horizontal period due to the selection of a clock frequency for making as narrow recording bandwidth as possible, the expanded horizontal period is made different at head switching from other horizontal period including picture information so that the recording signal has the periodicity over frames, according to this invention. In regard to the latitude of track width, the horizontal alignment, which would be unfulfilled due to the arbitrary selections of a head speed against tape and a track width, is established by shifting the time axis for each track, according to this invention.

A first embodiment of this invention will be described with reference to FIGS. 2A through 4. FIG. 2A shows the frame period of the input video signal. Although the input video signal actually consists of Y (luminance) signal, Cw (wide band chrominance) signal and Cn (narrow band chrominance) signal, they are represented by a single drawn line, on which numerals denote the relative scanning line number.

The input video signal has 1125 horizontal scanning lines for a frame of picture. Among these lines, those including picture information (i.e., active lines) are a group of 504 lines from line 51 to 554 for the first field and another group of 504 lines from line 613 to 1116 for the second field, and they are followed by a blanking period of 58 lines and another blanking period of 59 lines. In this invention, the 1008 active lines are added by the lines for the head switch blanking and additional reference signals to a total of 1046 lines for recording. Accordingly, 79 scanning lines as a result of 1125-1046 are removed from recording, as shown in FIG. 2B.

Figure 3A:
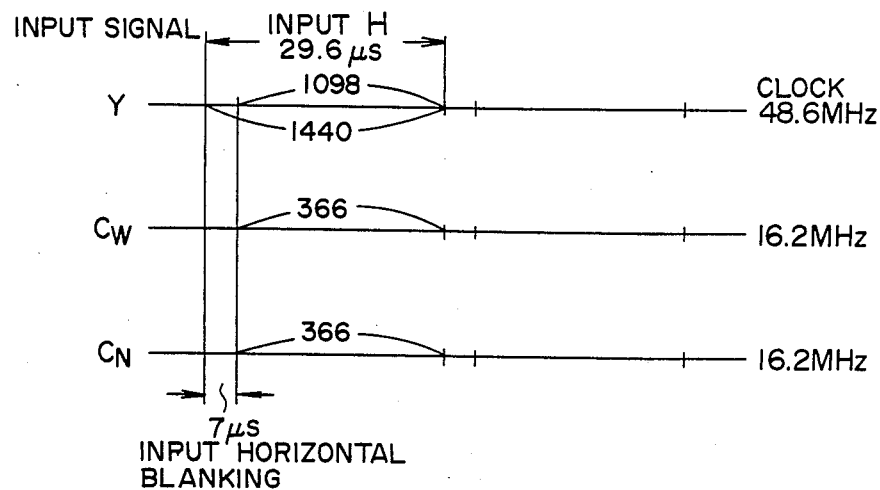
FIGS. 3A and 3B are diagrams explaining the 1-horizontal period of an input video signal.

FIG. 3A shows the input signal over horizontal scanning periods. The horizontal scanning frequency fh is: $30 \times 1125 = 33.75$ kHz. The horizontal scanning period is then: $1/fh = 29.6$ μs, in which are included a 22.6 μs effective picture section and a 7 μs horizontal blanking section.

Figure 3B:
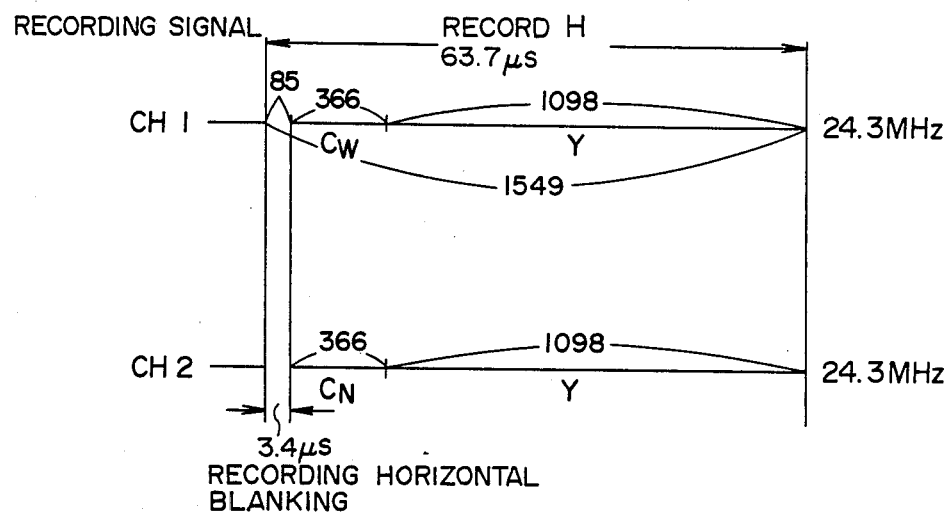

The signal is first rid of the horizontal blanking section 7 μs. The effective portions of the time-axis converted luminance signal (Y) and line-sequential chrominance signal (Cs) and a newly added sync signal for recording are multiplexed on the time axis to produce a recording video signal 1H. The recording sync signal is made up of a horizontal sync signal used for time-axis correction for the reproduced signal in a VTR and a burst signal, as shown in FIG. 3B.

More specifically, the Y signal has a sampling frequency of 48.6 MHz (1440×fh), and the CW and Cn signals have a sampling frequency of 16.2 MHz (48.6/3 or 480 fh). For the time-axis expansion by twofold for the luminance signal Y, the sampled signal is once written in the memory and then read out at a halved frequency 24.3 MHz (720 fh). Subsequently, for the time-axis compression to 1/1.5 for the Cs signal, the signal is read out at the same halved frequency. Through the time-axis expansion by twofold for Y and compression by 1/1.5 for Cs, the Y and C are time-axis multiplexed to have a width: $22.6 \times 2 + 22.6/1.5 = 60.3$ μs. The multiplexed signal is added by a new recording sync signal with a width of 3.4 μs to produce a total width of 63.7 μs, which is equal to the width of record H when 1046 scanning lines are recorded dividedly in two channels: $1/(30 \times 1046/2) = 63.7$ μs.

As a result of the process, a 2-channel TCI (Time Compressed Integration) signal in which the Y and Cs are time-axis multiplexed in 1H of recording signal is produced. Accordingly, the signal of one frame includes 1046H, or 523H in each channel, of the above recording signal. In the recording signal of each channel, a frame is divided into six segments, and accordingly each segment has a record of 87+1/6 lines.

The Y input signal includes 1440 samples and also the Cw and Cn include 480 samples in 1H in which the effective portion of Y is 1098 samples, and Cw and Cn has 366 samples each. Accordingly, the effective portion of Y and C, when time-axis multiplexed, is 1464 samples as a result of 1098+366, and the number of samples in 1H of recording signal is 1464 added by a new horizontal blanking section.

For each frame, the TCI signal of each channel has a total number of samples: $720 \times 1125 = 810,000$, and two channels have 1,620,000 samples. Dividing this figure with the number of H to be recorded, i.e., 1046, results in the number of samples in 1H of recording signal: $1,620,000/1046 = 1548.75717$, which is irrational.

Figure 4:
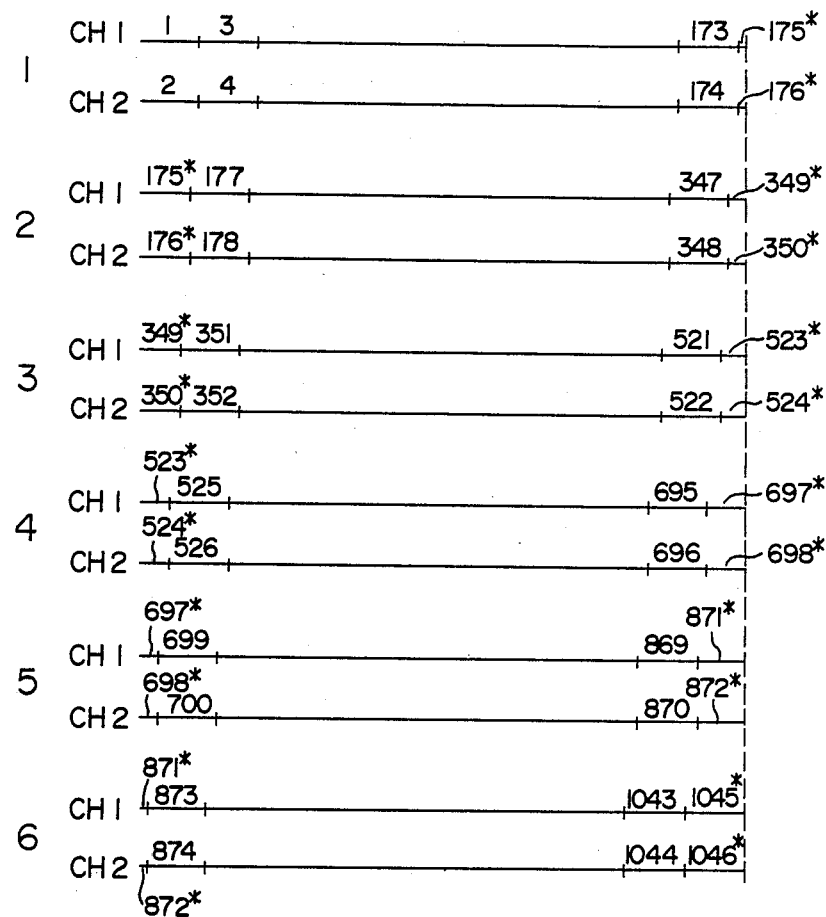
FIG. 4 is a diagram showing the segmented recording signals according to a first embodiment of this invention.

The following describes the method in this invention for solving the irrational matter for the case of 3-segment recording system with reference to FIG. 4. The figure shows all scanning lines in one frame (six segments). The serial scanning line number is appended to 1046 lines which is a result of 79-line reduction from 1125 lines. When 1046 lines are recorded by the 2-channel 3-segment recording system, each track has a record of 87 +1/6 lines, or each segment has 174+⅓ lines. In this case, head switching is needed three times for each field, or six times for each frame. Scanning lines in which duration the head switching takes place is indicated by symbol "*". Naming the segments as S1–S6, the head switching scanning line are lines 175 and 176 in S1, lines 349 and 350 in S2, lines 523 and 524 in S3, lines 697 and 698 in S4, lines 871 and 872 in S5, and lines 1045 and 1046 in S6.

Other usual H (517H) are set to have 1549 samples, while the six head-switching H are set differently, so that the total number of samples is rationalized in terms of frame. On this account, five H in S1–S5 are set to have 1528 samples and the H of S6 is set to 1527 samples: $1549 \times 517 + 1528 \times 5 + 1527 = 810,000$ samples in each channel, and the periodicity over frames is established. By setting the numbers of samples as described above, the horizontal blanking 3.4 μs of recording signal is alloted 85 samples as a result of 1549−1464. Even though there occurs an H having a different period from the inherent 1H period at the head switching zone, it imposes no practical problems if their difference is negligibly small as compared with the skew which arises inherently.

If it is intended to gain the periodicity over frames without using the foregoing process, it becomes necessary for the TCI signal to have a sampling frequency which not only has to b a multiple of fh of input signal, but must be selected to be a multiple (k x fht) of the H frequency fht of the recording TCI signal: fht=30×1046/2 (Hz). In consequence, the Y signal has a time-axis expansion factor of 1440×fh/(k x fht), and the two clock frequencies involve a complex relation. Conversely, in order to provide a simple relation between the clocks, a simple integral ratio must be met for the number of H recorded to the number 1125.

According to this embodiment of the invention, as described above, scanning lines are reduced and, in the case of the time-axis expansion, channel division recording system, the time-axis expanded clock can have a simple integral ratio even if the number of scanning lines recorded is chosen arbitrarily.

Figure 5:
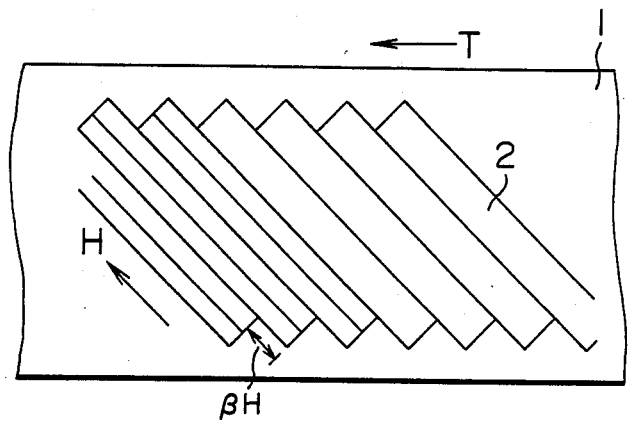
FIG. 5 is a diagram used to explain the recording format on a VTR.

Next, a second embodiment of this invention will be described with reference to FIGS. 5 through 9. FIG. 5 is a pictorial representation showing the recording format for a VTR. In the figure, a magnetic tape 1 has recording tracks 2, and the heads sweep in the direction H over the tape, while it is transported in the direction T. The H-offset between tracks has a distance of $\beta H$.

Figure 6:
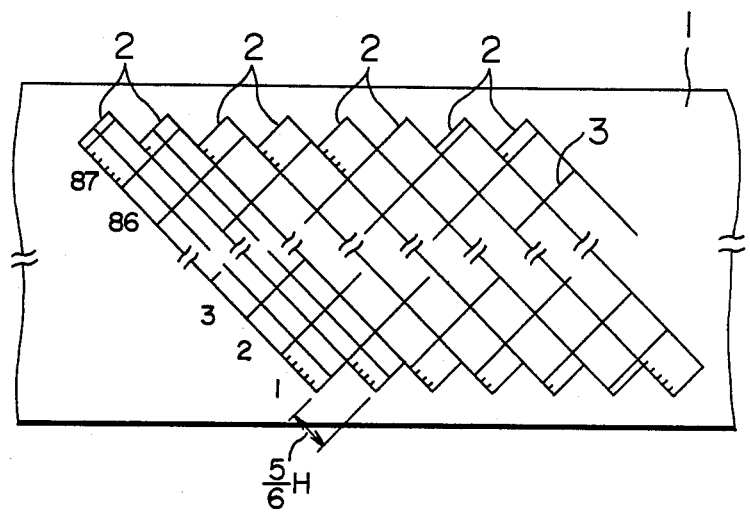
FIG. 6 is a diagram showing the condition in which the horizontal alignment is established naturally according to the first embodiment of this invention.

With the foregoing recording condition of 87+1/6 lines in each channel of one segment, the mechanical parameter $\beta H$ must be selected from m+5/6H (where m is an integer) in order to establish the horizontal alignment, as shown in FIG. 6, where symbol 3 denotes the recording horizontal sync signal.

As a condition of determining the VTR tape speed, the following can be said. For long time recording, the tape speed must be slow, which requires a small track pitch and a narrow track width, resulting in a low picture quality. In order to gain the picture quality, the tape speed must be increased. In practice, the track width, track pitch and resulting tape speed are determined on a trade-off basis from the intended picture quality and recording time length to accomplish a best balanced picture quality and recording time length. When the tape speed determined by the above procedure is used for recording, the horizontal alignment on the tape is not established in general. The reason is that the horizontal alignment is defined by the geometrical relation among the track pitch, the tape travel distance during a head scan, the number of records (H) in a track, and the length of record (H). On this account, if the mechanical condition of horizontal alignment is imposed, it is not always possible to optimize both of the picture quality and recording time length. In the present example, the $\beta H$ must meet one of $5/6H$, $1+5/6H$, $2+5/6H$ and so on, as mentioned above.

Figure 7:
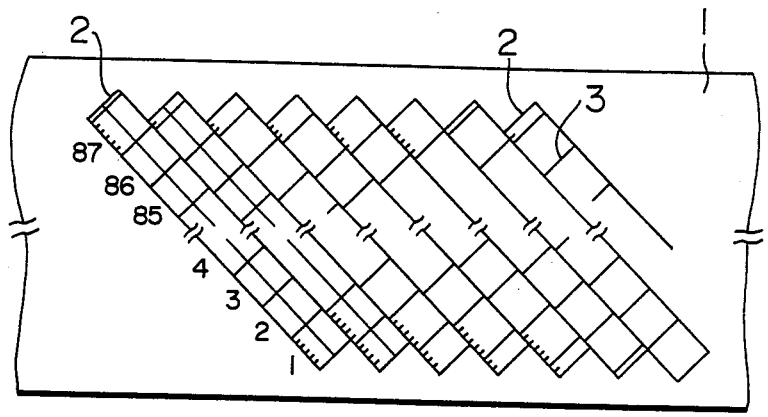
FIG. 7 is a diagram showing that the horizontal alignment is not established when the value of $\beta H$ is made equal to one horizontal period 1H.
Figure 9:
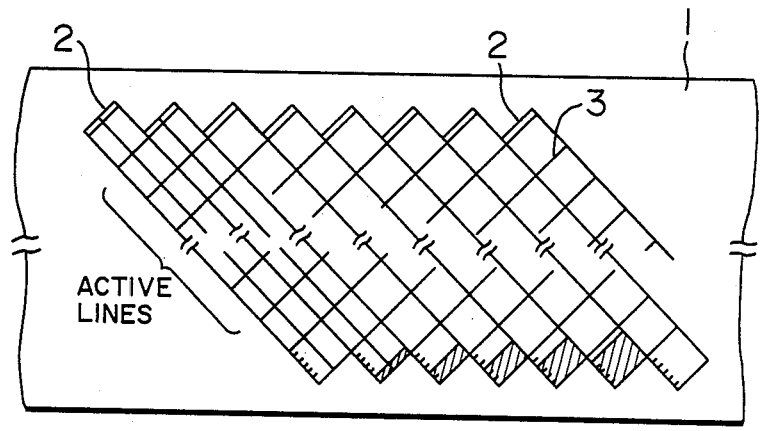
FIG. 9 is a diagram showing the establishment of horizontal alignment in the second embodiment of this invention.

Recording of the above signal with a VTR having $\beta H = 1H$ is as shown in FIG. 7. The second embodiment of the invention is intended to establish the horizontal alignment by shifting the recording signal on the time axis for each track. As shown in FIG. 8B, the first segment is recorded without time shift, the second, third, fourth, fifth and sixth segments are recorded with time shifts (retardation in this case) of $1/6H$, $2/6H$, $3/6H$, $4/6H$ and $5/6H$, respectively. The resultant records in horizontal alignment is shown in FIG. 9.

The number of H recorded in one segment can be set arbitrarily by choosing the number of lines eliminated; i.e., any of K, $K+1/6$, $K+2/6$, $K+3/6$, $K+4/6$ and K 5/6 (where K is an integer) is possible. In recording this signal with the above VTR, the i-th segment is given a delay of 0, $1/6(i-1)H$, $2/6(i-1)H$, $3/6(i-1)H$, $4/6(i1)H$ and $5/6(i-1)H$, corresponding to the number of H, and the horizontal alginment is established in each case. Conversely, when the VTR has its $\beta H$ changed, the condition of horizontal alignment is readily achieved by altering the number of recording lines and the amount of time shift accordingly. Accordingly, the track pitch can be chosen in a relatively wide range while retaining the horizontal alignment condition. The second embodiment of the invention allows a greater latitude of design as compared with conventional systems.

The following describes the apparatus which realizes the second embodiment of the inventive method.

FIG. 10 shows in block diagram the video signal recording/reproducing apparatus according to an embodiment of this invention. Shown in the figure by 4 is an input terminal to receive a video signal, 5 is an A/D converter, 6 is a blanking detect/remove circuit, 7 is a channel split/time expansion circuit, 8 is a segment process/time shift circuit, 9 and 10 are D/A converters, 11 and 12 are FM modulators, 13 and 14 are recording heads, 1 is a magnetic tape, 15 and 16 are reproducing heads, 17 and 18 are FM demodulators, 19 and 20 are A/D converters, 21 is a time shift/segment process circuit, 22 is a time compress/channel merge circuit, 23 is a blanking adding circuit, 24 is a D/A converter, and 25 is a video signal output terminal.

The operation of the video signal recording/reproducing apparatus arranged as described above will be described. The high definition video signal shown in FIG. 2A is received on the input terminal 4. The video signal is converted into digital data by the A/D converter 5, and it is fed to the blanking detect/remove circuit 6. The circuit 6 removes unneeded 79 lines of vertical blanking, leaving 38 lines of vertical blanking necessary for the head switching and segment process, and provides 1046 recording lines as shown in FIG. 2B. Subsequently, the channel split/time expand circuit 7 divides the data into two channels, and then implements the time-axis expansion by $2 \times 1125/1046$ times, as shown in FIG. 8A. The segment process/time shift circuit 8 includes a frame memory, and after it has once stored the expanded video signal, it divides the data of one channel of one frame into six segments, each consisting of $87 + 1/6$ lines, with 84 lines being made active lines and the preceding and following lines being made blanking lines. Among the segmented video signals in the circuit 8, the first segment is read out without time shift, and the second, third, fourth, fifth and sixth segments are read out with time shifts (retardation in this case) by $1/6H$, $2/6H$, $3/6H$, $4/6H$ and $5/6H$, respectively. As a result of the above process, the video signals have a timing relationship as shown in FIG. 8B. Then, the signals are converted into analog signals by the D/A converters 9 and 10, modulated by the FM modulators 11 and 12, and recorded by the recording heads 13 and 14 on the magnetic tape 1, with the horizontal alignment being established as shown in FIG. 9, in contrast to the case without the time-axis shift shown in FIG. 7.

Signal reproduction is exactly reverse to the recording operation, retrieving the original video signal shown in FIG. 2A. The reproducing heads 15 and 16 operate to pick up signals on the recording track shown in FIG. 9, and the signals are demodulated by the FM demodulators 17 and 18, which provide the reproduced video signals shown in FIG. 8B. The demodulated signals are converted into digital data by the A/D converters 19 and 20, and they are fed to the time shift/segment process circuit 21. The circuit 19 once stores the video data, and then reads out the first, second, third, fourth and fifth segments with delays of $5/6H$, $4/6H$, $3/6H$, $2/6H$ and $1/6H$, respectively, and the sixth segment without delay. As a result of this time-axis shift process, horizontal sync pulses have a unique interval. The circuit 21 restores the order of the active lines and blanking lines to provide the video signals shown in FIG. 8A. The 2-channel signals undergo time-axis compression by $1046/2 \times 1125$ time and merged into 1-channel signal by the time-compress/channel merge circuit 22, which provides the signal shown in FIG. 2B The blanking adding circuit 23 supplements the blanking lines which have been removed at recording to restore 1125 lines, and finally the D/A converter 24 converts the data back to the original analog video signal on the output terminal 25.

Although in the above description of embodiment the horizontal alignment of segments has been set to $\beta H = 1H$, it can be established for any value of $\beta H$ through the proper selection of the time shift value in the time shift/segment process circuits 8 and 12.

Although in the above description of embodiment the input video signal has been of high-definition having 1125 scanning lines and, after removing 79 blanking lnes, 1046 lines have been recorded, the inventive method is applicable generally to a video signal having N scanning lines for recording, after removal of M lines, N-M lines.

Although in the above description of embodiment the input video signal has been transformed into 2-channel time-expanded signals and recorded in three segments, it is obvious that the horizontal alignment of recorded pattern can be established by choosing the time shift value appropriately for a general case of reforming the input signal into n-channel time-expanded signals and recorded in L segments in one field.

We claim:

1. A video signal recording method, comprising:
   (a) removing M scanning lines from N scanning lines per frame of an input video signal to obtain a reduced signal, where M and N are each a positive integer,
   (b) producing a time-axis expanded luminance signal, a time-axis compressed chrominance signal and a sync signal based on said reduced signal obtained by step (a), and a performed a time-axis multiplex operation on the three signals to produce sets of horizontally integral signals divided into n channels, where n is an integer greater than or equal to one, and
   (c) dividing the horizontally integral signals provided by step (b) into L segments for each field and recording the segmented signals sequentially in L time scanning operations on a magnetic tape, where L is an integer greater than or equal to one.

2. A video signal recording method according to claim 1, wherein step (c) comprises recording the segmented signals by making a length of the horizontally integral signals different at a time of head switching from a length thereof at other times so that the recording signals have a periodic characteristic over a plurality of frames 3. A video signal recording method according to claim 1, wherein step (c) comprises recording the segmented signals by time-axis shifting them by a predetermined distance each segment so that horizontal sync signals of the recorded signals on adjacent tracks align spatially with each other normal to a lengthwise direction of the tracks.

4. A video signal recording/reproducing apparatus, comprising:
   a circuit for producing a resultant video signal having N-M scanning lines by removing M scanning lines from N scanning lines per one frame of an input video signal to produce a reduced signal, where M and N are each positive integer,
   a circuit for producing time-axis expanded signals divided into n channels and time-axis expanded approximately nN/(N-M) times based on said resultant signal, where n is an integer greater than or equal to one,
   a circuit for dividing said time-axis expanded signals into L segments for each field, where L is an integer greater than or equal to one, and
   a circuit for time-axis shifting each segment of the divided signals so that horizontal sync signals of the recorded signals on adjacent tracks of a magnetic tape align spatially with each other normal to a lengthwise direction of the tracks,
   wherein the time-shifted signals are recorded on a magnetic tape as segmented recording tracks.

* * * * *

UNITED STATES PATENT AND TRADEMARK OFFICE
CERTIFICATE OF CORRECTION

PATENT NO. : 4,839,744

DATED : June 13, 1989

INVENTOR(S) : Sasaki et al

It is certified that error appears in the above-identified patent and that said Letters Patent is hereby corrected as shown below:

On the cover page, item "[73] Assignees:" should read:

Nippon Hoso Kyokai, Tokyo;
    Matsushita Electric Industrial Co., Ltd.,
      Osaka, both of Japan Signed and Sealed this Tenth Day of September, 1991

Attest:

HARRY F. MANBECK, JR.

*Attesting Officer*    *Commissioner of Patents and Trademarks*